United States Patent [19]

Isaksson

[11] Patent Number: 5,526,582
[45] Date of Patent: Jun. 18, 1996

[54] PRESSURIZED REACTOR SYSTEM AND A METHOD OF OPERATING THE SAME

[75] Inventor: Juhani M. Isaksson, Karhula, Finland

[73] Assignee: A. Ahlstrom Corporation, Noormarkku, Finland

[21] Appl. No.: 220,387

[22] Filed: Mar. 31, 1994

[51] Int. Cl.⁶ ............................................. F26B 3/00
[52] U.S. Cl. .................... 34/476; 34/363; 34/362; 110/347; 60/39.464
[58] Field of Search ............................ 34/402, 405, 362, 34/363, 413, 417, 476, 477; 60/39.12, 39.464; 122/4 D; 110/244, 245, 263, 266; 165/104.16

[56] References Cited

U.S. PATENT DOCUMENTS

| | | | |
|---|---|---|---|
| 4,744,212 | 5/1988 | Andersson et al. | 60/39.02 |
| 4,909,163 | 3/1990 | Hjalmarsson | 110/266 |
| 5,146,856 | 9/1992 | George | 110/171 |
| 5,293,843 | 3/1994 | Provol et al. | 122/4 D |

Primary Examiner—Denise L. Gromada
Assistant Examiner—Susanne C. Tinker
Attorney, Agent, or Firm—Nixon & Vanderhye

[57] ABSTRACT

A method and apparatus are provided for operating a pressurized reactor system in order to precisely control the temperature within a pressure vessel in order to minimize condensation of corrosive materials from gases on the surfaces of the pressure vessel or contained circulating fluidized bed reactor, and to prevent the temperature of the components from reaching a detrimentally high level, while at the same time allowing quick heating of the pressure vessel interior volume during start-up. Superatmospheric pressure gas is introduced from the first conduit into the fluidized bed reactor and heat derived reactions such as combustion and gassification are maintained in the reactor. Gas is exhausted from the reactor and pressure vessel through a second conduit. Gas is circulated from one part of the inside volume to another to control the temperature of the inside volume, such as by passing the gas through an exterior conduit which has a heat exchanger, control valve, blower and compressor associated therewith, or by causing natural convection flow of circulating gas within one or more generally vertically extending gas passages entirely within the pressure vessel (and containing heat exchangers, flow rate control valves, or the like therein). Preferably, inert gas is provided as a circulating gas, and the inert gas may also be used in emergency shut-down situations. In emergency shut-down reaction gas being supplied to the reactor is cut off, while inert gas from the interior gas volume of the pressure vessel is introduced into the reactor.

38 Claims, 2 Drawing Sheets

PRESSURIZED REACTOR SYSTEM AND A METHOD OF OPERATING THE SAME

The Government of the United States of America has rights in this invention pursuant to Contract No. DE-FC21-91MC-27364 awarded by the U.S. Department of Energy.

BACKGROUND AND SUMMARY OF THE INVENTION

The invention relates to a pressurized reactor system and a method of operating the same. More precisely, the present invention relates to a method and apparatus for controlling the conditions inside a pressure vessel of a pressurized reactor system while heat derived reactions (e.g., combustion or gassification) are being practiced in the pressurized reactor system, and for simultaneously controlling the conditions in the pressure vessel.

U.S. Pat. No. 5,251,343 discloses a pressurized fluidized-bed boiler power plant, having an air cooler positioned in a duct for conveying the compressed air from the compressor to the boiler. The pressure vessel of the power plant has also a heat insulating shield inside the pressure vessel. The compressed air cooled by the cooler is introduced into the volume between the insulating shield and the inner wall of the pressure vessel and further into the volume between the shield and the reactor. The air is finally supplied to the boiler for combustion therein. This solution does not, however, give adequate active control of the temperature in the pressure vessel; the gas flow and the temperature always depend on the process requirements in the reactor, i.e., combustion.

Cooling of compressed air prior to introducing it into the pressure vessel has also been suggested in publication WO/91/17389 and U.S. Pat. No. 4,852,345. Both documents teach cooling compressed air prior to introducing it into a pressure vessel and subsequently to a reaction chamber.

It has also been suggested to provide a flow of water in the wall structure of the reaction chamber system to maintain the temperature of the reaction wall at a certain level. However, this level is usually so high that the water must be at a very high pressure, e.g. up to 5 bar, in order to avoid vaporization and maintain controllability of the temperature. Such high-pressure structures are costly, massive, and are usually undesirable.

Prior art systems still have significant drawbacks, especially with respect to active control of the conditions in the pressure vessel. Cooling of the pressure vessel by providing process gas flow through an entire gas volume of a pressure vessel provides inadequate control.

According to one aspect of the present invention, a method of operating a pressurized reactor system is provided. The reactor system includes a process vessel assembly, having a reaction chamber, enclosed within a pressure vessel, a first conduit for conveying pressurized gas to the reactor system, an inside volume within the pressure vessel defined between the interior of the pressure vessel and the exterior of the process vessel assembly, and a second conduit for conveying discharged gas from the process vessel assembly to the exterior of the pressure vessel. The method comprises the steps of: (a) Introducing superatmospheric pressure gas from the first conduit into the process vessel assembly. (b) Maintaining heat derived reactions in the reaction chamber of the process vessel assembly. (c) Exhausting gas from the process vessel assembly and pressure vessel through the second conduit. (d) Circulating gas from one part of the inside volume to another to control the temperature of the inside volume.

Step (d) is preferably practiced by circulating an inert gas, such as nitrogen or carbon dioxide, or alternatively, recirculating the air. There is also preferably the further step of cooling or heating the circulating gas during the practice of step (d). Also, there are preferably the further steps of controlling the flow rate of the circulating gas during the practice of step (d) (as by controlling an automatically operated valve, or by controlling the speed of a fan or blower), and in increasing the pressure of the circulating gas during the practice of step (d) (as by introducing compressed gas into the recirculation loop). The heating step may be practiced during start-up, and then there is the further step, after start-up is completed, of terminating the heating of the circulating gas and subsequently cooling the circulating gas during the practice of step (d).

Step (d) may be practiced by withdrawing gas from the inside volume at a first location to pass it outside the pressure vessel; modifying the temperature of, and boosting the pressure of, the circulating gas outside the pressure vessel; and returning the circulating gas to the inside volume at a second location spaced a significant distance from the first location. Step (d) may be further practiced by withdrawing circulating gas from the top of the pressure vessel and returning the gas near the bottom of the pressure vessel (during the steady-state operating procedure), or vice-versa (typically during start-up). Alternatively, step (d) may be practiced essentially completely within the inside volume within the pressure vessel by providing one or more interior generally vertical conduits complete with the inside volume and by practicing step (d) within the interior generally vertical conduits. During the practice of step (d) the gas typically flows generally upwardly downwardly in the interior conduit by natural convection, and the temperature of the gas may be modified as it is circulating within the interior conduit.

Step (c) is typically practiced by combustion or gassification of fuel in a fluidized bed of solids, the process vessel assembly comprising a circulating fluidized bed reactor, and step (a) is typically practiced to introduce gas under pressure between 2–100 bar. Also, in response to, or in anticipation of, a shutdown of the process vessel assembly, gas may be withdrawn from the inside gas volume and introduced into the circulating fluidized bed reactor to terminate the combustion or gasification reactions therein.

Step (d) is typically practiced to modify the temperature of the circulating gas to avoid condensation of corrosive gases on, and to prevent the temperature increasing to detrimental levels in the pressure vessel and process vessel system.

According to another aspect of the present invention, a pressurized reactor system is provided comprising the following elements: A pressure vessel. A process vessel assembly within the pressure vessel, having a reaction chamber in which heat derived reactions take place. An inside gas volume defined between the interior of the pressure vessel and the exterior of the process vessel assembly. A source of superatmospheric pressure gas exterior of the pressure vessel. A first conduit for conveying gas from the source to the reaction chamber in the process vessel assembly. A second conduit for conveying gas discharged from the reaction chamber to the exterior of the pressure vessel; and means for circulating gas from one part of the inside volume to another to control the temperature of the inside volume.

The gas circulating means may include a gas passage and means for heating or cooling the gas contained within the gas passage. The gas passage is typically disposed either primarily exteriorily of the pressure vessel, or completely within the pressure vessel. Where the gas passage is disposed primarily exteriorily of the pressure vessel, means are provided for withdrawing gas from a first part of the pressure vessel and reintroducing the withdrawing gas after heating or cooling thereof into a second part of the vessel lightly spaced from the first part, at least enough to effect the desired function of the circulation means.

The system may further comprise a fan or blower disposed in the passage exteriorily of the pressure vessel for controlling the flow rate of gas circulation and acting on the gas to effect circulation thereof. There may also be provided means for boosting the pressure of the circulating gas, such as a compressor.

The process vessel assembly preferably comprises a circulating fluidized bed reactor.

A control valve is preferably provided in the first conduit, which control valve may be automatically operated to close off the supply of reaction gas to the fluidized bed reactor in emergency situations.

The circulating means may include a generally vertically extending gas passage disposed completely within the inside volume, having an opening for entry or exit of gas within the inside gas volume adjacent a bottom portion thereof, and an opening for exit or entry of gas from said passage adjacent the top thereof. The direction of gas flow through the circulation means is determined by convection due to the cooling or heating of the circulating gases. Means for heating or cooling gas circulating in the gas passage may be disposed in the gas passage, such means comprising, for example, a tube type heat exchanger or a plate heat exchanger which defines a part of the passage. The gas passage is preferably dimensioned, oriented, and constructed so that gas circulates therethrough by natural convection.

A pressure relief valve may be provided connected to the pressure vessel to vent pressure therefrom under emergency situations. Also, a third conduit is preferably provided leading from the inside gas volume to outside the pressure vessel, and then back into the reaction chamber and then the fluidized bed reactor, and an automatically operated valve is provided in the third conduit exteriorily of the pressure vessel. An automatically controlled valve is also preferably disposed in a gas passage exteriorily of the pressure vessel.

The circulating means disposed interiorily of the pressure vessel may include a generally vertically extending plate disposed entirely within the inside gas volume and spaced from, but adjacent, a vertical wall of the pressure vessel to define the gas passage which is open at the top and bottom. A flow control valve may be provided adjacent the bottom of the passage. A plurality of interior tubes or gas-passage defining plates may be provided in the pressure vessel.

When gas is introduced into one end of a circulation conduit, e.g. at the upper portion of the pressure vessel, and, when the gas is, e.g. cooled, it flows downwardly as a result of a pressure difference, which is dependent on the gas density. The pressure difference as a driving force thus results from the cooling of the gas. Thus, circulation of the gas may be provided even without a mechanical blower. A minimum requirement is to provide a flow channel between two locations in the vessel, and to connect the heat transfer means in such a manner that the temperature of the circulating gas is influenced: if the gas is heated, the flow direction is upward, and if cooled, it is downward.

It is desirable to use inert gas as the circulation gas, thereby reducing the risk of corrosion of the gas flow-defining surfaces to a minimum. The inert gas may be $N_2$, $CO_2$, or other available inert gas or gas mixtures. Use of inert gas gives an additional advantage: by using inert gas as the circulating gas, it is possible to utilize the circulating for emergency shutdowns. If the pressurized fluidized bed reactor system is used for pressurized gasification or combustion of fuel material, e.g., in connection with a gas turbine-compressor unit driving a generator, there is a need for quick termination of reactions in the process vessel system. If there is reason for a quick shutdown—such as by a sudden loss of turbine load—it is essential to terminate the combustion reaction in the reactor immediately for safety reasons. This may be completed very conveniently by injecting the circulating inert gas into the reaction chamber. For that purpose, the gas circulation system may be provided with a quick-connect conduit to take the inert gas into the reactor via conduits leading thereto.

DETAILED DESCRIPTION OF THE DRAWINGS

Figure 1:
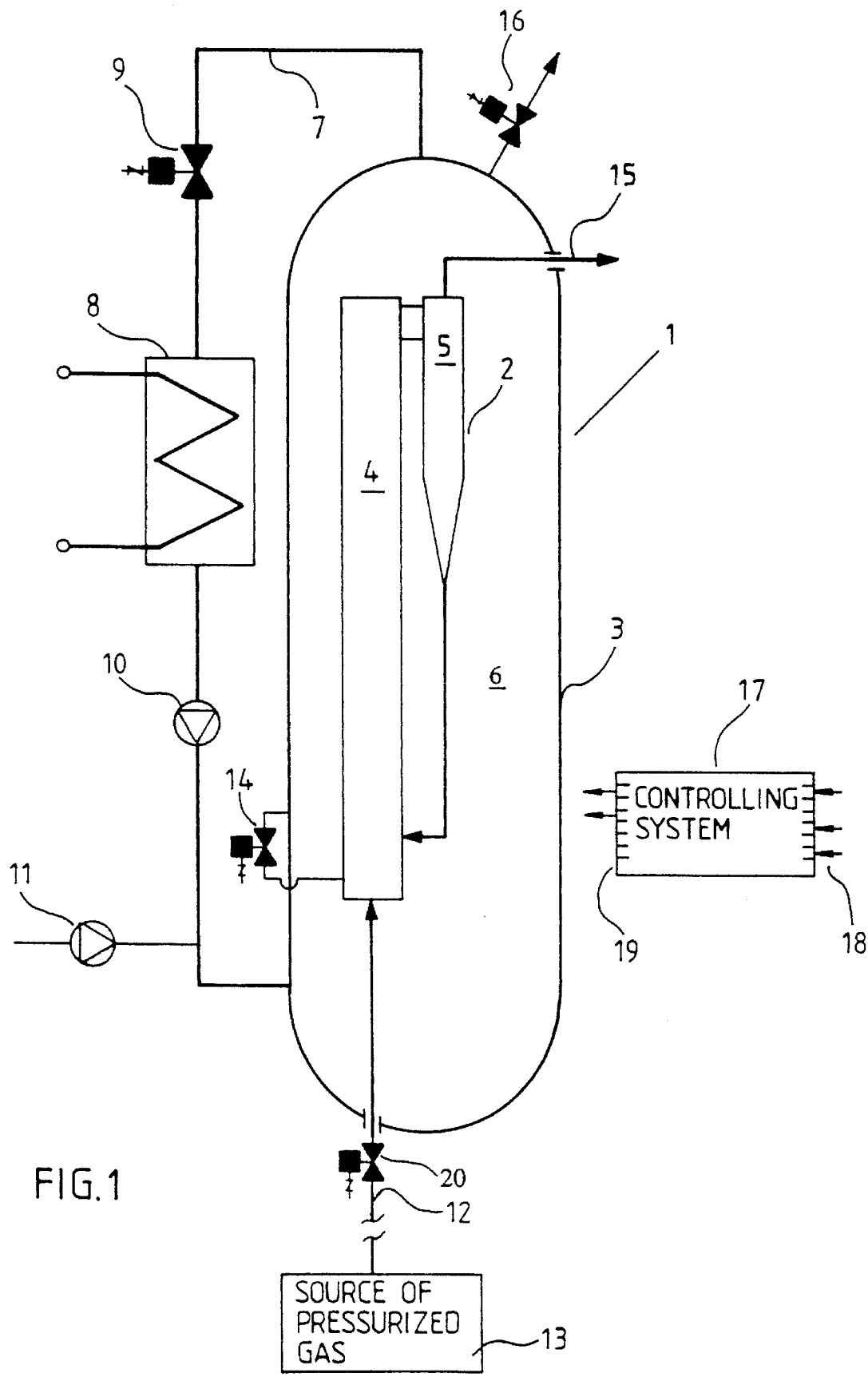
FIG. 1 is a schematic side view depicting an exemplary embodiment of a pressurized fluidized bed reactor according to the present invention.

A pressurized fluidized bed reactor system 1 in accordance with a preferred embodiment of the present invention is illustrated in FIG. 1. The system comprises a process vessel assembly 2 (preferably a circulating fluidized bed reactor with a reaction chamber) enclosed by a pressure vessel 3. An inside gas volume 6 is formed between the interior surface of the vessel 3 and the exterior of the assembly 4. The process vessel system 2 is shown as a circulating fluidized bed reactor having a reaction chamber 4 and a solids separator 5 as well as a conduit 15 for conveying product (exhaust) gases out of the reaction chamber 4 for further processing. Product gases may be, e.g. in connection with combustion, flue gases, or if gasification is practiced in the reaction chamber, a combustible product gas. The inside gas volume 6 is connected with means for circulating gas from one area within volume 6 to another. The circulating means may comprise a conduit 7 for conveying the circulating gas. The conduit 7 is provided with means for processing the gas, such as a heat exchanger 8 for cooling or heating the circulation gas, as desired. Cooling or heating of the circulating gas is preferably accomplished by regulating the temperature of secondary heat transfer medium in the heat exchanger 8, if the circulation gas is, e.g., desired to be heated, warmer heat transfer medium is supplied to the heat exchanger.

During start-up of the system 1, the heat exchanger 8 may be used for heating the circulation gas in order to reduce the required start-up time. In normal operation of the system 1, the temperature of the gas volume 6 is controlled to maintain the surrounding wall surfaces of the vessel 3 at desired temperatures, particularly to avoid any detrimental condensation of corrosive gaseous compounds in the gas, as well as to eliminate the possibility that the surrounding structures (3,4) reach a detrimentally high temperature.

The conduit 7 further comprises an automatically controlled valve 9 and a blower or fan 10 for controlling the flow rate of the circulating gas.

In the reaction chamber 4, reactions such as gasification or combustion of fuel material, take place. Gas for the reactions is delivered from a source 13 of superatmospheric pressure (e.g., 2–100 bar) reaction gas (e.g. a compressor) via a conduit 12 directly to the reaction chamber 4. In the FIG. 1 embodiment, the circulation gas is not mixed with reaction gas. Thus, it is possible to select circulation gas independently of the gas requirements of the reaction in chamber 4. For example, in a gasification process $N_2$ may be used as a circulating gas (in volume 6) and air/steam as a reaction gas (introduced via conduit 12).

In FIG. 1 only those features are shown which are necessary for understanding the present invention, but it should be understood that any known other devices may be utilized, if desired. Further, only one heat exchanger is illustrated, but there may be several, if required, and the direction of the circulation gas may be selected according to specific requirements of each application, as well as the order of the processing equipment, e.g. fans, valves, etc. In FIG. 1, where distinct circulation and reaction gases are provided, there is a pressurizing device 11, such as a compressor, with which the static pressure in the pressure vessel 3 (volume 6) may be adjusted as desired. Compressor 11 may also be used to introduce fresh gas into the gas volume 6 and, in order to keep the pressure at a desired level, there may also be provided a pressure relieving means (e.g. pressure relief valve) 16, through which gas may be vented from the vessel 3.

Utilization of an inert gas in volume 6 is preferred according to the present invention. Inert gas, such as $N_2$, reduces any risk of corrosion of the materials in the gas volume 6 and has an additional effect. The very same circulation gas, e.g. $N_2$, which is circulated during normal operation of the system 1 may be used to control the conditions in the gas volume 6, especially the temperature, in order to avoid dew point corrosion, is readily available for emergency shutdown. In case the reactions in the reaction chamber must be terminated quickly, the means 14 is utilized to introduce the circulation gas into the reaction chamber 4. The most important concern in case of a sudden shutdown is that the supply of the reaction gas via conduit 12 be immediately stopped (as by shutting automatically controlled valve 20) and inert gas from the gas volume 6 introduced into the reaction chamber 4. The inert gas may also be fed via conduit 7 by introducing the inert gas into the conduit 7 after closing of valve 20.

There is preferably also provided a controlling system 17 for processing input signals 18 transmitted from various process equipment. All of the devices described above may be provided with transmitting (e.g. sensing) devices, as well as receivers for receiving output signals 19 from the control system 17, and thus the steps described previously described in connection with the FIG. 1 embodiment may be controlled by, e.g., a computerized controller as the controlling system 17.

Figure 2:
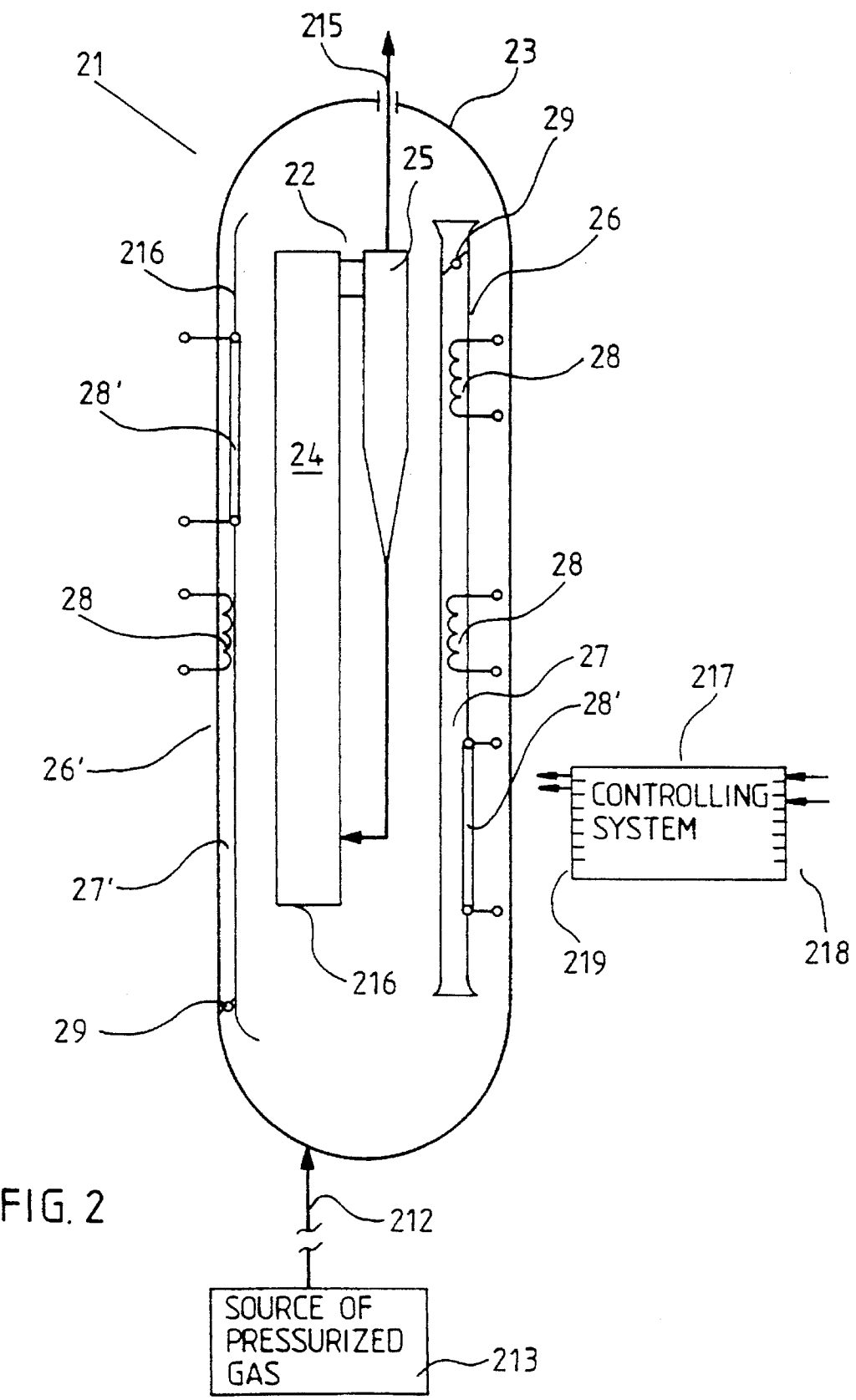
FIG. 2 is a schematic side view depicting another exemplary embodiment of pressurized fluidized bed reactor of the present invention.

It should also be understood that the circulation circuit may be provided essentially completely within the pressure vessel 3, as illustrated in FIG. 2, instead of primarily externally of the vessel 3, as in FIG. 1. Although the embodiment illustrated in FIG. 2 shows no separate circulation gas in the inside gas of the pressure vessel 3 in volume 30, alternatively a separate, inert gas circulation circuit, may be preferred in some cases.

FIG. 2 shows a pressurized fluidized bed reactor system 21 in accordance with a preferred embodiment of the present invention, comprising a process vessel assembly 22 enclosed within a pressure vessel 23. The process vessel assembly 22 preferably is a circulating fluidized bed reactor 24 having a solid separator 25 and a product gas outlet conduit 215 conveying exhaust gases out of vessel 23 for further processing. Reaction gas is introduced into the reaction chamber 24 through an inlet 216 from the gas volume 30, after having been led to the pressure vessel 23 via conduit 212 from a source of superatmospheric gas 213. In this case the reaction gas may be air, assuming that the combustion of fuel material is practiced in the reaction chamber 24.

In FIG. 2 one or more gas circulation means 26 and 26' are constructed inside the pressure vessel 23. The gas circulation system 26 comprises a generally vertical conduit (tube) 27 for conveying the circulating gas, and the processing sequence is performed in the conduit. The preferred processing sequence is realized by providing the passage 27 with heat transfer elements 28 and 28'. Heat exchanger 28 may comprise a tube bank or plate heat exchanger, while heat exchanger 28' comprises a plate heat transfer element forming part of the wall structure of the passage 27 or 27'. The passage 27' may also be provided with an automatically operated control valve 29 to regulate the flow rate of the circulating gas.

Circulation of the gas in passages 27, 27' results from natural convection, i.e., substantially without an additional circulation fan or blower. Cooling or heating of the gas in the passages 27, 27' increases or decreases the gas density, respectively, thus causing movement by natural convection.

The circulation means 26' comprises a channel or passage 27' formed simply by providing a wall member 216 in proximity to a generally vertical wall of the pressure vessel 23. This is merely an exemplary illustration, and it should be understood that any suitable construction in the vessel 23 may be used to form the channel 27' by placing a wall member 216 in the vicinity thereof. As is the case with passage 27, the passage 27' is provided with heat transfer devices 28 and 28'. The selection of number, type or exact position of the heat exchangers 28, 28' depends upon the specific application.

There is also preferably provided a controlling system 217 for processing input signals 218 transmitted from various process equipment. All of the devices described above may be provided with transmitting features as well as receiving features to receive output signals 219 from the controlling system 217. Thus, the equipment described previously in connection with FIG. 2 may be controlled by, e.g., a computerized controller of the controlling system 217.

FIGS. 1 and 2 are merely illustrative of the present invention, and various features of the FIGS. 1 and 2 embodiments may be substituted for each other. For example, separate circulation gas and reaction gas may be used in connection with a system with an inner circulation as described in FIG. 2, so that a distinct reaction gas introduction conduit is required from a source of pressurized gas directly to the reaction chamber 24 as well as a supply of separate circulation gas to the gas volume 30 of the pressure vessel 23. In such a modification, the use of inert gas provides an additional preferred effect of quickly terminating the reaction in the reaction chamber by introducing the circulation gas thereinto in an event of a sudden emergency shutdown, as described in connection with apparatus 14 of FIG. 1.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a pressurized reactor system including a process vessel assembly, having an exterior and having a reaction chamber, enclosed within a pressure vessel, having an interior, a top, and a bottom, a first conduit for conveying pressurized gas to the reactor system, an inside volume within the pressure vessel defined between the interior of the pressure vessel and the exterior of the process vessel assembly, and a second conduit for conveying discharged gas from the process vessel assembly to the exterior of the pressure vessel, comprising the steps of:
   (a) introducing superatmospheric pressure gas from the first conduit into the process vessel assembly;
   (b) maintaining heat derived reactions in the reaction chamber of the process vessel assembly;
   (c) exhausting gas from the process vessel assembly and pressure vessel through the second conduit; and
   (d) circulating gas from one part of the inside volume to another, at a flow rate, to control the temperature of the inside volume.

2. A method as recited in claim 1 wherein step (d) is practiced by circulating inert gas.

3. A method as recited in claim 1 wherein step (d) is practiced by circulating nitrogen or carbon dioxide gas.

4. A method as recited in claim 1 wherein step (d) is practiced by circulating air.

5. A method as recited in claim 1 comprising the further step of cooling the circulating gas during the practice of step (d).

6. A method as recited in claim 1 comprising the further step of heating the circulating gas during the practice of step (d).

7. A method as recited in claim 1 comprising the further step of controlling the flow rate of the circulating gas during the practice of step (d).

8. A method as recited in claim 1 comprising the further step of increasing the pressure of the circulating gas during the practice of step (d).

9. A method as recited in claim 6 wherein said heating step is practiced during start-up, and comprising the further step, after start-up is completed, of terminating heating of the circulating gas and subsequently cooling the circulating gas during the practice of step (d).

10. A method as recited in claim 9 comprising the further steps of controlling the flow rate of, and boosting the pressure of, the circulating gas during the practice of step (d).

11. A method as recited in claim 1 wherein step (d) is practiced by: withdrawing gas from the inside volume at a first location to pass it outside the pressure vessel; modifying the temperature of, and boosting the pressure of, the circulating gas outside the pressure vessel; and returning the circulating gas to the inside volume at a second location spaced a significant distance from the first location.

12. A method as recited in claim 11 wherein step (d) is further practiced by withdrawing circulating gas from the top of the pressure vessel, and returning the gas near the bottom of the pressure vessel.

13. A method as recited in claim 1 wherein step (d) is practiced essentially completely within the inside volume within the pressure vessel, comprising a recirculation of gas between the top and bottom inside the pressure vessel.

14. A method as recited in claim 13 wherein an interior generally vertical conduit having an open top and open bottom is provided completely within the inside volume, and wherein step (d) is practiced within the interior generally vertical conduit, gas flowing through the open top and bottom thereof.

15. A method as recited in claim 14 wherein during the practice of step (d) the gas flows generally upwardly or downwardly in the interior conduit by natural convection.

16. A method as recited in claim 15 comprising the further step of modifying the temperature of gas as it is circulating within the interior conduit.

17. A method as recited in claim 1 wherein step (c) is practiced by combustion or gassification of fuel in a fluidized bed of solids, the process vessel assembly comprising a circulating fluidized bed reactor, and wherein step (a) is practiced to introduce gas at a pressure of between 2–100 bar.

18. A method as recited in claim 17 comprising the further step of in response to, or in anticipation of, a shutdown of the process vessel assembly, withdrawing gas from the inside volume, and introducing the withdrawn gas into the circulating fluidized bed reactor to terminate the combustion or gassification reactions therein.

19. A method as recited in claim 18 wherein step (d) is practiced to modify the temperature of the circulating gas to avoid condensation of corrosive gases on, and to prevent the temperature increasing to a detrimental level in, the pressure vessel and process vessel system.

20. A pressurized reactor system comprising:
   a pressure vessel having an interior, a top, and a bottom;
   a process vessel assembly within said pressure vessel, having an exterior, and having a reaction chamber in which heat derived reactions take place;
   an inside gas volume defined between the interior of said pressure vessel and the exterior of said process vessel assembly;
   a source of superatmospheric pressure gas exterior of said pressure vessel;
   a first conduit for conveying gas from said source to said reaction chamber in said process vessel assembly;
   a second conduit for conveying gas discharged from said reaction chamber to the exterior of said pressure vessel; and
   means for circulating gas from one part of said inside volume to another, at a flow rate, to control the temperature of said inside volume.

21. A pressurized reactor system as recited in claim 20 wherein said means for circulating includes a gas passage, and means for heating or cooling the gas contained within said gas passage.

22. A pressurized reactor system as recited in claim 20 wherein said gas passage is disposed primarily exteriorly of said pressure vessel, means for withdrawing gas from a first part of said pressure vessel, and reintroducing the withdrawn gas after heating or cooling thereof into a second part of said pressure vessel widely spaced from said first part.

23. A pressurized reactor system as recited in claim 22 further comprising a fan or blower disposed in said passage exteriorly of said pressure vessel for controlling the flow rate of gas circulation and acting on the gas to effect circulation thereof.

24. A pressurized reactor system as recited in claim 23 further comprising means for boosting the pressure of the circulating gas.

25. A pressurized reactor system as recited in claim 23 wherein said process vessel assembly comprises a circulating fluidized bed reactor.

26. A pressurized reactor system as recited in claim 25 further comprising a control valve in said first conduit.

27. A pressurized reactor system as recited in claim 20 wherein said circulating means includes a generally vertically extending gas passage disposed completely within said inside volume, having an opening for entry of gas within said inside volume adjacent a bottom portion thereof, and an opening for exit of gas from said passage adjacent the top thereof; and means for heating or cooling gas circulating in said gas passage disposed within said passage.

28. A pressurized reactor system as recited in claim 27 wherein said gas passage is dimensioned, oriented and constructed so that gas circulates therethrough by natural convection.

29. A pressurized reactor system 28 wherein said means for heating or cooling gas in said passage comprises a tube bank heat exchanger or a plate heat exchanger which defines part of said passage.

30. A pressurized reactor system as recited in claim 27 wherein said process vessel assembly comprises a circulating fluidized bed reactor.

31. A pressurized reactor system as recited in claim 20 further comprising a pressure relief valve connected to said pressure vessel, and a third conduit leading from said inside volume to outside said pressure vessel, and then back into said reaction chamber within said process vessel assembly, and an automatically operated valve in said third conduit exteriorly of said pressure vessel.

32. A pressurized reactor system as recited in claim 22 further comprising an automatically controlled valve disposed in said gas passage exteriorly of said pressure vessel.

33. A pressurized reactor system as recited in claim 22 further comprising a compressor connected to said gas passage exteriorly of said pressure vessel to increase the pressure of the circulating gas.

34. A pressurized reactor system as recited in claim 20 wherein said circulating means includes a generally vertical tube disposed entirely within said inside volume open at the top and bottom thereof.

35. A pressurized reactor system as recited in claim 20 wherein said circulating means includes a generally vertically extending plate disposed entirely within said inside volume and spaced from, but adjacent, a vertical wall of said pressure vessel to define a gas passage, said passage open at the top and bottom thereof and dimensioned, oriented and constructed to provide passage of gas therein due to natural convection.

36. A pressurized reactor system as recited in claim 35 further comprising a tube bank heat exchanger within said passage or a plate tube heat exchanger which defines part of said passage, for heating or cooling gas flowing in said passage.

37. A pressurized reactor system as recited in claim 34 further comprising a tube bank heat exchanger or a plate tube heat exchanger disposed within said tube for heating or cooling gas flowing therein.

38. A pressurized reactor system as recited in claim 35 further comprising a gas flow rate controlling valve in said passage.

* * * * *